United States Patent [19]

Miyazaki et al.

[11] Patent Number: 4,578,109
[45] Date of Patent: Mar. 25, 1986

[54] PROCESS FOR THE PRODUCTION OF ANODE ACTIVE MATERIALS FOR USE IN CELLS

[75] Inventors: Kazuhide Miyazaki; Toyohide Uemura; Katsuzo Nakaso, all of Takehara, Japan

[73] Assignee: Mitsui Mining & Smelting Co., Ltd., Tokyo, Japan

[21] Appl. No.: 735,229

[22] Filed: May 17, 1985

[30] Foreign Application Priority Data

May 17, 1984 [JP] Japan .................................. 59-97481

[51] Int. Cl.$^4$ ......................... C22C 1/04; C22C 18/00
[52] U.S. Cl. .................................. 75/0.5 C; 75/0.5 A; 75/0.5 B; 420/513; 420/514; 420/523
[58] Field of Search ................ 75/0.5 B, 0.5 C, 0.5 A; 420/513, 514, 523

[56] References Cited

U.S. PATENT DOCUMENTS

| 359,835 | 3/1887 | Beattie, Jr. | 420/513 |
| 3,649,364 | 3/1972 | Bonnefille et al. | 75/0.5 C |
| 3,764,388 | 10/1973 | Marincic | 420/513 |
| 4,460,543 | 7/1984 | Glaeser | 420/513 |

Primary Examiner—Wayland Stallard
Attorney, Agent, or Firm—Sughrue, Mion, Zinn, Macpeak & Seas

[57] ABSTRACT

Anode active materials comprising amalgamated zinc powder for use in cells, which may well achieve inhibition of corrosion of zinc with a smallest possible amount of mercury, may be produced by a process comprising atomizing a molten zinc added with mercury to obtain pre-amalgamated zinc powder and bringing thus obtained powder, which is dispersed in a liquid, into contact with mercury or an amalgam to further amalgamate said pre-amalgamated zinc powder.

34 Claims, No Drawings

PROCESS FOR THE PRODUCTION OF ANODE ACTIVE MATERIALS FOR USE IN CELLS

FIELD OF THE INVENTION

The present invention relates to a process for the production of anode active materials comprising amalgamated zinc powder, which may be used in various primary cells, e.g. alkaline electrolyte cells based on, for example, zinc-manganese dioxide system, zinc-mercuric oxide system and zinc-silver oxide system as well as in secondary battery systems.

BACKGROUND OF THE INVENTION

Since primary cells of the type having a zinc anode mostly use a strong alkaline electrolyte (e.g. a concentrated aqueous solution of KOH saturated with ZnO), they must be sealed over their casings so as to avoid leakage of the alkaline electrolyte. This, however, results unfavorably in enclosure of hydrogen gas generated due to corrosion of the zinc anode. Thus if the sealing is perfect, the pressure of the hydrogen gas evolved may increase during the storage of the cell and can sometimes lead to the critical point at which the cell may explode.

To preclude such unfavorable phenomena, there have been reported many improvements on the cell construction in an attempt to minimize the effect of hydrogen gas pressure. However, these improvements are, in most cases, insufficient to achieve prevention of a possible explosion of the cell.

The most useful or effective technique to prevent such an alteration inside the cell is one in which an amalgamated zinc powder is used as an anode active material so as to achieve inhibition of corrosion by way of increasing hydrogen overvoltage of zinc.

Heretofore, there have been employed two types of process for manufacturing such an amalgamated zinc powder, that is, a process in which a molten zinc added with mercury is atomized to form particles, and a process in which zinc powder is placed in a liquid and subject to contact with mercury.

The amalgamated zinc powder as produced by these conventional processes, however, contains 5 to 10% wt% of mercury by necessity to prevent corrosion of zinc, and is therefore harmful to human being or other living things and can cause environmental pollution.

SUMMARY OF THE INVENTION

It is an object of the present invention to provide a process for the production of anode active materials comprising amalgamated zinc powder, which may well achieve inhibition of corrosion of zinc during the storage of the cell with a smallest possible amount of mercury to be added.

The above object of the present invention may be accomplished by a process for the production of anode active materials for use in cells, comprising atomizing a molten zinc added essentially with mercury to obtain pre-amalgamated zinc powder (hereinafter referred to as the atomization step), and bringing thus obtained pre-amalgamated zinc powder, which is subsequently dispersed in a liquid, into contact with mercury or an amalgam to further amalgamate said pre-amalgamated zinc powder (hereinafter referred to as the secondary amalgamation step).

DETAILED DESCRIPTION OF THE INVENTION

The anode active materials to be produced by the process of the present invention may be used in various types of the primary cells as illustrated above. Therefore the amalgamated zinc powder as twice amalgamated in accordance with the present invention may contain one or more optional components other than zinc and mercury, so as to gain adequate properties for the respective application of the anode active materials.

Illustrative examples of such optional components include lead, indium, thallium, silver, gallium, aluminum and cadmium.

The introduction of these optional components into the amalgamated zinc powder may be done during the atomization step and/or the secondary amalgamation step. By way of example, almost all of the optional components as illustrated above may be added to the molten zinc to be atomized. Some components, such as indium, thallium, gallium and cadmium, may advantageously be alloyed with mercury and subject to contact with the pre-amalgamated zinc powder during the secondary amalgamation step.

The atomization step may be carried out by known atomization methods which may have been employed for the production of the conventional amalgamated zinc powder. Any type of atomizer may be used. The amount of mercury to be added to the molten zinc to be atomized, however, may be smaller, than that of the conventional amalgamated zinc powder, namely 0.1~4.9 parts by weight per 100 parts by weight of zinc.

In addition, the amount of mercury to be brought into contact with the pre-amalgamated zinc powder during the secondary amalgamation step may also be such a small one as 0.1~4.9 parts by weight per 100 parts by weight of zinc in the pre-amalgamated zinc powder.

In the secondary amalgamation step, mercury or the amalgam that contains said optional components may advantageously be added into said liquid in the shape of small droplets by means of, for example, a medical injector, so as to achieve sufficient contact or reaction between the pre-amalgamated zinc powder and mercury or the amalgam. During the contact, the liquid is preferably stirred continuously.

In a preferred embodiment of the present invention, the pre-amalgamated zinc powder consists of particles having the diameters of from 75 to 500 $\mu$m. The droplets of mercury or the amalgam subjected to contact with the pre-amalgamated zinc powder preferably have the diameters of from 500 to 1000 $\mu$m.

The liquid used to disperse the pre-amalgamated zinc powder in the secondary amalgamation step is preferably the aqueous solution that should not dissolve said optional components to be added, more preferably an aqueous alkaline solution, such as aqueous solutions of KOH and NaOH.

The present invention will be described more minutely by the following Examples.

EXAMPLE 1

To 1 kg of molten zinc maintained at 500° C. were added 1 g of mercury and 0.5 g of lead to pre-amalgamate said zinc melt. The thus pre-amalgamated zinc melt was subject to atomization by means of the atomizer (V-type jet method with compressed argon gas) to obtain pre-amalgamated zinc powder (particle size: 75~500 $\mu$m).

On the other hand, indium-amalgam was prepared by mixing 0.2 g of indium and 4 g of mercury in (1:10) dilute hydrochloric acid solution.

Thereafter, 1 kg of the pre-amalgamated zinc powder as above was poured in 2 l of 10% aqueous solution of KOH and stirred at 20° C. for 5 minutes in order to readily disperse the power. The indium amalgam as above was introduced dropwise into the solution by means of a medical injector. The injected droplets of amalgam were approximately 700 μm in diameter and brought into contact with the dispersed powder by continuously stirring the solution at 20° C. for 60 minutes. After the secondary amalgamation was completed, the amalgamated zinc powder was washed with water and dried at 45° C. overnight.

The thus obtained amalgamated zinc powder consists of 0.05 wt% of lead, 0.02 wt% of indium, 0.5 wt% of mercury and the balance of zinc.

Thereafter the corrosion test was carried out at 45° C. for a quantity of 10 g sample of the thus obtained zinc powder of Zn-Pb-In-Hg system in contact with 5 ml of 40 wt% aqueous solution of KOH which was saturated with ZnO. The result is shown in Table 1 as the amount of hydrogen gas generated during the storage (ml/g-sample·day).

COMPARATIVE EXAMPLE 1

To 1 kg of molten zinc maintained at 500° C. were added 5 g of mercury, 0.5 g of lead and 0.2 g of indium to pre-amalgamate said zinc melt. The thus pre-amalgamated zinc melt was subject to atomization in the same manner as in Example 1.

The thus obtained pre-amalgamated zinc powder having the composition identical with that prepared in Example 1, was subject to the corrosion test same as in Example 1. The result is shown in Table 1.

COMPARATIVE EXAMPLE 2

Indium amalgam was prepared by mixing 0.2 g of indium and 5 g of mercury in (1:10) dilute hydrochloric acid solution.

Thereafter, 1 kg of zinc-lead alloy powder, containing 0.05 wt% of lead, was poured into 2 l of 10 % aqueous solution of KOH and stirred at 20° C. for 5 minutes in order to readily disperse the powder. The indium amalgam as above was then introduced into the solution by means of the same injector as in Example 1 and bright into contact with the dispersed powder by continuously stirring the solution for 60 minutes. After the amalgamation was completed, thus amalgamated zinc powder was washed with water and dried at 45° C. overnight.

The thus obtained amalgamated zinc powder having the composition identical with that prepared in Example 1, was subject to the corrosion test same as in Example 1. The result is shown in Table 1. T,90

As shown in Table 1, the anode active material as produced through the process in accordance with the present invention (Example 1) is far more effective in inhibiting the corrosion of zinc than the conventional amalgamated zinc powder, even with the same amount of mercury added.

What is claimed:

1. A process for the production of anode active materials for use in cells, comprising atomizing a molten zinc to which mercury has been added to obtain pre-amalgamated zinc powder, and dispersing the thus obtained pre-amalgamated zinc powder in a liquid, and contacting the so dispersed zinc powder with mercury or an amalgam to further amalgamate said pre-amalgamated zinc powder.

2. The process as set forth in claim 1, wherein prior to atomizing said molten zinc another component or components for constituting the anode active material selected from lead, indium, thallium, silver, gallium, aluminum and cadmium are added to said molten zinc.

3. The process as set forth in claim 1, wherein said amalgam to be brought into contact with the pre-amalgamated zinc powder contains mercury and other component or components for constituting the anode active material which are selected from indium, thallium, gallium and cadmium.

4. The process as set forth in claim 1, wherein the amount of mercury to be added to the molten zinc is 0.1~4.9 parts by weight per 100 parts by weight of zinc.

5. The process as set forth in claim 1, wherein the amount of mercury to be brought into contact with the pre-amalgamated zinc powder is 0.1~4.9 parts by weight per 100 parts by weight of zinc in the amalgamated zinc powder.

6. The process as set forth in claim 1, wherein said mercury or amalgam to be brought into contact with the pre-amalgamated zinc powder is introduced into said liquid in the shape of small droplets.

7. The process as set forth in any one of claims 6 or 20 through 34, wherein said pre-amalgamated zinc powder consists of amalgamated zinc particles having the diameters of from 75 to 500 μm, and said droplets have the diameters of from 500 to 1000 μm.

8. The process as set forth in any one of claims 1 through 6 or 9 through 34, wherein said liquid in which said pre-amalgamated zinc powder is dispersed is an aqueous alkaline solution selected from aqueous KOH and NaOH solutions.

* * * * *

UNITED STATES PATENT AND TRADEMARK OFFICE
CERTIFICATE OF CORRECTION

PATENT NO. : 4,578,109
DATED : March 25, 1986
INVENTOR(S) : Miyazaki et al

It is certified that error appears in the above-identified patent and that said Letters Patent is hereby corrected as shown below:

At column 4, line 2, delete "T,90" and insert therefor the following Table 1:

Table 1

|  | Content (wt%) | | | Amount of Hydrogen generated (ml/g-sample·day) |
|---|---|---|---|---|
|  | lead | indium | mercury |  |
| Example 1 | 0.05 | 0.02 | 0.5 | $2.6 \times 10^{-3}$ |
| Comparative Example 1 | 0.05 | 0.02 | 0.5 | $7.8 \times 10^{-3}$ |
| Comparative Example 2 | 0.05 | 0.02 | 0.5 | $4.2 \times 10^{-3}$ |

Signed and Sealed this

Fifteenth Day of November, 1988

Attest:

DONALD J. QUIGG

Attesting Officer

Commissioner of Patents and Trademarks